(12) United States Patent
Heo et al.

(10) Patent No.: US 7,210,561 B2
(45) Date of Patent: May 1, 2007

(54) LUBRICATING DEVICE OF RECIPROCATING COMPRESSOR

(75) Inventors: Jong-Tae Heo, Gyeonggi-Do (KR); Jin-Young Jung, Seoul (KR); Jong-Koo Lee, Gyeonggi-Do (KR); Jin-Dong Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 630 days.

(21) Appl. No.: 10/663,654

(22) Filed: Sep. 17, 2003

(65) Prior Publication Data
US 2004/0104076 A1 Jun. 3, 2004

(30) Foreign Application Priority Data
Dec. 3, 2002 (KR) .................. 10-2002-0076347

(51) Int. Cl.
*F01M 1/00* (2006.01)
(52) U.S. Cl. ............... 184/6.16; 184/54; 415/88
(58) Field of Classification Search ........... 184/6.16, 184/6, 54, 103.1; 415/88
See application file for complete search history.

(56) References Cited

U.S. PATENT DOCUMENTS

| | | | | | |
|---|---|---|---|---|---|
| 5,816,783 | A | * | 10/1998 | Oshima et al. | 417/415 |
| 6,048,178 | A | * | 4/2000 | Kawaguchi et al. | 417/222.2 |
| 6,193,475 | B1 | * | 2/2001 | Rozek | 417/360 |
| 6,202,791 | B1 | * | 3/2001 | Oh et al. | 184/6.16 |
| 6,220,393 | B1 | * | 4/2001 | Oh et al. | 184/6.16 |
| 6,299,421 | B1 | * | 10/2001 | Oh et al. | 417/571 |
| 6,409,484 | B1 | * | 6/2002 | Hyun | 417/417 |
| 6,494,293 | B1 | * | 12/2002 | Jung | 184/6.16 |
| 6,585,500 | B2 | * | 7/2003 | Park et al. | 417/549 |
| 7,063,520 | B2 | * | 6/2006 | Oh et al. | 417/547 |
| 2002/0157902 | A1 | * | 10/2002 | Oh | 184/6.16 |
| 2004/0104076 | A1 | * | 6/2004 | Heo et al. | 184/6.16 |

FOREIGN PATENT DOCUMENTS

WO 00/26536 5/2000

* cited by examiner

*Primary Examiner*—David Morgan Fenstermacher
(74) *Attorney, Agent, or Firm*—Greenblum & Bernstein, P.L.C.

(57) ABSTRACT

A lubricating device of a reciprocating compressor includes a pumping unit for pumping lubrication oil contained in a lower portion of a case and a front frame having a supply hole which supplies the lubrication oil pumped from the pumping unit to a sliding part within the case and a discharge hole which discharges the lubrication oil upon completion of a lubrication operation. A lubrication oil storage is arranged at a front of the discharge hole for storing the lubrication oil discharged to the discharge hole for a predetermined time and then discharging the lubrication oil. A lubrication oil guide is provided for guiding the lubrication oil discharged from the discharge hole to a lower portion of the case in order to prevent the lubrication oil discharged through the discharge hole from flowing to an air hole formed at a front frame. In the device, lubrication oil is discharged after foam generated by mixture between lubrication oil and a working fluid is burst in the lubrication oil, thereby reducing noise generated when the foam is burst.

18 Claims, 10 Drawing Sheets

LUBRICATING DEVICE OF RECIPROCATING COMPRESSOR

CROSS-REFERENCE TO RELATED APPLICATION

The present application claims priority under 35 U.S.C § 119 of Korean Application No. 76347/2002, which was filed on Dec. 3, 2002, the disclosure of which is expressly incorporated by reference herein in its entirety.

BACKGROUND OF THE INVENTION

1. Field of the Invention

The present invention relates to a reciprocating compressor. In particular, the present invention relates to a lubricating device of a reciprocating compressor which reduces noise generated when lubricating oil is discharged and prevents the lubricating oil from flowing back.

2. Description of the Related Art

Generally, compressors can be divided into different categories including a rotary compressor, a reciprocating compressor, a scroll compressor, and etc. based upon the method utilized therein for compressing a fluid.

FIG. 1 is a sectional view of a reciprocating compressor in accordance with the conventional art.

The reciprocating compressor according to the conventional art comprises a hermetically-sealed case 106 to which a suction pipe 102 and a discharge pipe 104 are connected, a driving unit 108 provided in the case 106 for generating a reciprocating force, a compressing unit 110 for compressing a fluid by application of the reciprocating force generated by the driving unit 108, and a lubricating device for supplying lubricating oil to each frictionally-contacting part of the compressor.

The driving unit 108 includes an outer stator 116 of a cylindrical shape arranged between a middle frame 112 and a rear frame 114 an inner stator 118 spaced by a predetermined air gap from an inner circumferential surface of the outer stator 116. A coil 120 to which power from a power source is applied is coiled or wound about an inner part of the outer stator 116. A magnet 122 arranged between the outer stator 116 and the inner stator 118 with a predetermined interval for linearly reciprocating when power is applied to the coil 120.

The magnet 122 is fixed to an outer circumferential surface of a magnet holder 124 with a same interval, and the magnet holder 124 is connected to a piston 126 of the compressing unit 110. The piston 126 is connected to a spring supporter 128.

A first spring 130 and a second spring 132 are respectively arranged at both sides of the spring supporter 128 and a front frame 134 on one hand, and the middle frame 112 on the other hand, thereby providing an elastic force when the piston 126 moves forward or backward.

The compression unit 110 includes the piston 126 connected to the magnet holder 124 for linearly reciprocating; a cylinder 136 into which the piston 126 is slidingly-inserted for forming a predetermined compression space 142; a suction valve 140 mounted in front of the piston 126 for opening/closing a fluid passage 138 formed at the piston 126; and a discharge valve assembly mounted at the front frame 134 for opening/closing the flow of fluid to be discharged.

The discharge valve assembly includes: a discharge valve 144 tightly pressed into contact with a front surface of the cylinder 136 and capable of being opened and closed; a discharge cover 146 engaged to a front of the cylinder 136 and connected to the discharge pipe 104 through which a fluid is discharged; and a spring 148 arranged between an inner side of the discharge cover 146 and the discharge valve 144 for providing a predetermined elastic force to the discharge valve 144.

The lubricating device, as shown in FIGS. 2 and 3, supplies lubricating oil contained in a lower portion of the case 106 to a sliding part or area between the cylinder 136 and the piston 126. The lubricating device includes: a pumping unit 150 mounted at a lower side of the front frame 134 for pumping lubricating oil; a supply passage 152 formed at a front of the front frame 134 for supplying the lubricating oil pumped by the pumping unit 150; a lubricating oil suction hole 154 connected to the supply passage 152 for taking-in lubricating oil and conveying the oil into the sliding part between the cylinder 136 and the piston 126; and a discharge hole 156 formed at an opposite side of the suction hole 154 at the front frame 134 for discharging the lubrication oil which has finished a lubrication operation back into the compressor case.

An engaging portion 162 to which the discharge cover 146 is bolt-engaged protrudes from the front of the front frame 134, and an air hole 160 for passing gas towards inner and outer sides of the front frame 134 is formed therein and extends along a circumferential direction of the engaging portion 162 so that a resistance may not be generated when the piston 126 reciprocates.

Operations of the lubricating device will be explained. As shown in FIG. 3, when the pumping unit 150 is operated, the lubricating oil contained in the lower portion of the case 106 is pumped to the supply passage 152, and supplied to the sliding part (i.e., surface) between the cylinder 136 and the piston 126 through the suction hole 154, thereby performing a lubrication operation. Then, the lubricating oil which finished the lubrication operation is discharged to an inside of the case 106 through the discharge hole 156, and is collected at the lower portion of the case 106.

However, in the lubricating device according to the conventional art, since the lubrication oil is discharged in a mixed state with a fluid (e.g., air) through the discharge hole 156, foam is generated. Accordingly, if the lubrication oil having the foam is discharged, the foam bursts and noise is generated.

Also, since the lubrication oil is discharged through the discharge hole 156 with a high pressure, the lubrication oil collides with an inner wall of the case 106 and generates noise.

Additionally, if the lubrication oil discharged through the discharge hole 156 and then sucked into the air hole 160 formed at the front of the front frame 134, a flow resistance of the fluid is generated when the piston 126 reciprocates, thereby lowering a performance of the compressor.

SUMMARY OF THE INVENTION

Therefore, an object of the present invention is to provide a lubricating device of a reciprocating compressor which reduces noise generated at the time when foam bursts by improving a discharge structure of lubrication oil and thus by discharging the lubrication oil after foam generated from a mixture between the lubrication oil and a fluid is burst in the lubrication oil.

Another object of the present invention is to provide a lubricating device of a reciprocating compressor which reduces a collision noise of lubrication oil by preventing the lubrication oil discharged through a discharge hole from colliding with an inner wall of a case.

Still another object of the present invention is to provide a lubricating device of a reciprocating compressor which prevents a performance deterioration of a compressor by preventing lubrication oil from flowing into an air hole formed at a front frame.

To achieve these and other advantages and in accordance with the purpose of the present invention, as embodied and broadly described herein, there is provided a lubricating device of a reciprocating compressor including a pumping unit for pumping lubrication oil contained in a lower side of a case and a front frame having a suction hole which supplies the lubrication oil pumped from the pumping unit to a sliding part in the case. A discharge hole discharges the lubrication oil which finishes a lubrication operation and a lubrication oil storage arranged at a front of the discharge hole for storing the lubrication oil discharged to the discharge hole for a predetermined time and then discharging the oil.

A cross-sectional area of the discharge hole of the lubricating device is formed to be larger than that of the suction hole.

The lubrication oil storage is composed of a lateral wall portion that protrudes from a front surface of the front frame with a predetermined width for covering right and left sides of the discharge hole, and a frontal wall portion that contacts a front surface of the lateral wall portion for forming a lubrication oil storage space with the lateral wall portion.

The lateral wall portion of the lubrication oil storage is protrudes at the front surface of the front frame and then extends at an engaging portion engaged to the discharge cover.

The front wall portion of the lubrication oil device extends from a cover plate engaged between the engaging portion of the front frame and the discharge cover.

The front wall portion of the lubrication oil storage is formed to be lower than the lateral wall portion so that the lubrication oil in the storage space can flow over.

The lubricating device according to the present invention comprises: a pumping unit for pumping lubrication oil filled in a lower side of a case a front frame having a supply hole which supplies the lubrication oil pumped from the pumping unit to a sliding part in the case and a discharge hole which discharges the lubrication oil that has finished a lubrication operation. A lubrication oil storage is arranged at a front of the discharge hole for storing the lubrication oil discharged to the discharge hole for a predetermined time and then discharging the oil. A lubrication oil guide is provided for guiding the lubrication oil discharged to the discharge hole in a lower direction of the case in order to prevent the lubrication oil discharged through the discharge hole from flowing to an air hole formed at the front frame.

The lubrication oil guide is composed of a guide portion that extends from the lateral wall portion that protrudes at a front surface of the front frame towards right and left sides with a curved surface shape for covering the air hole.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the written description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
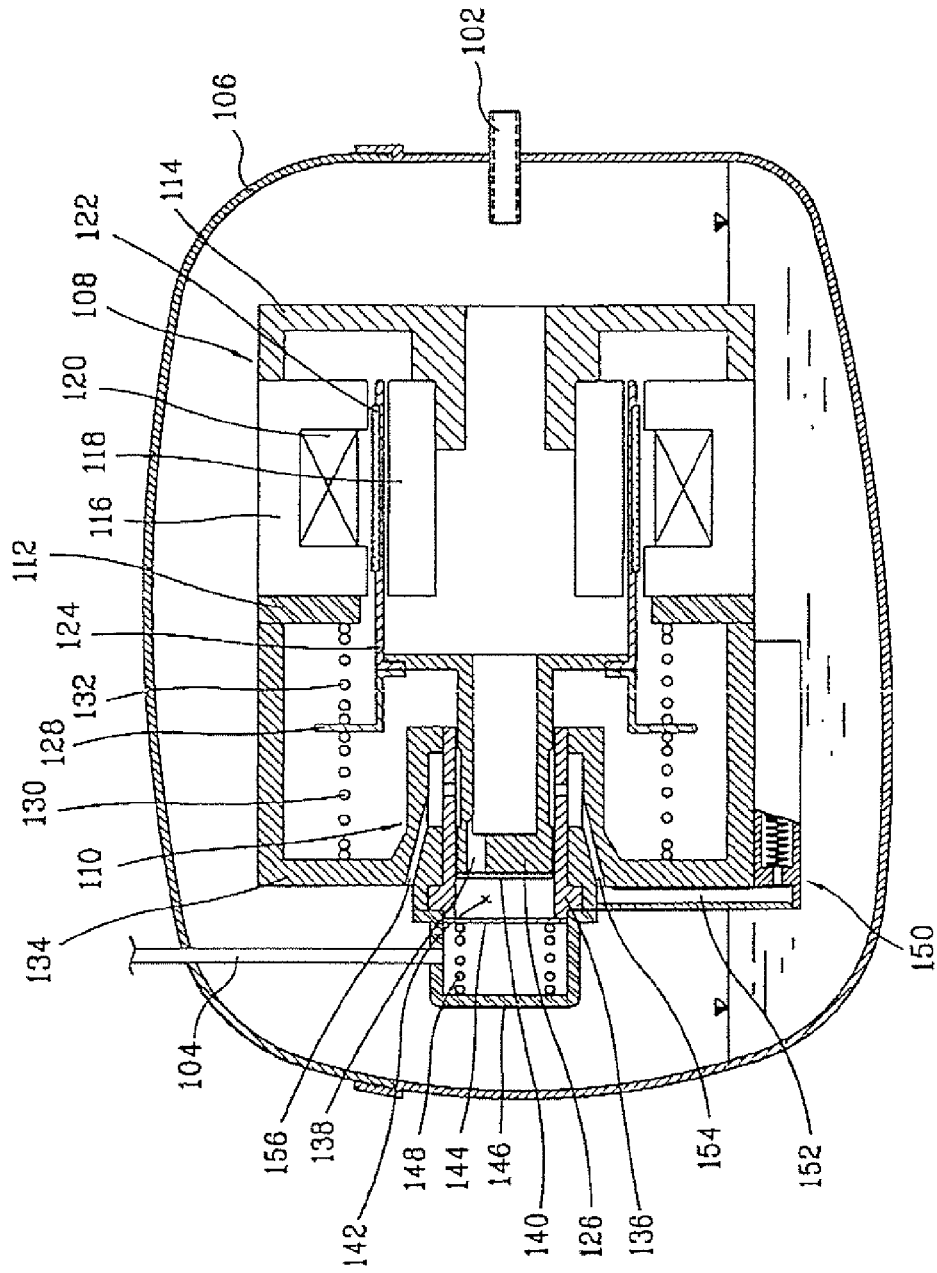
FIG. 1 is a sectional view of a reciprocating compressor in accordance with the conventional art.
Figure 2:
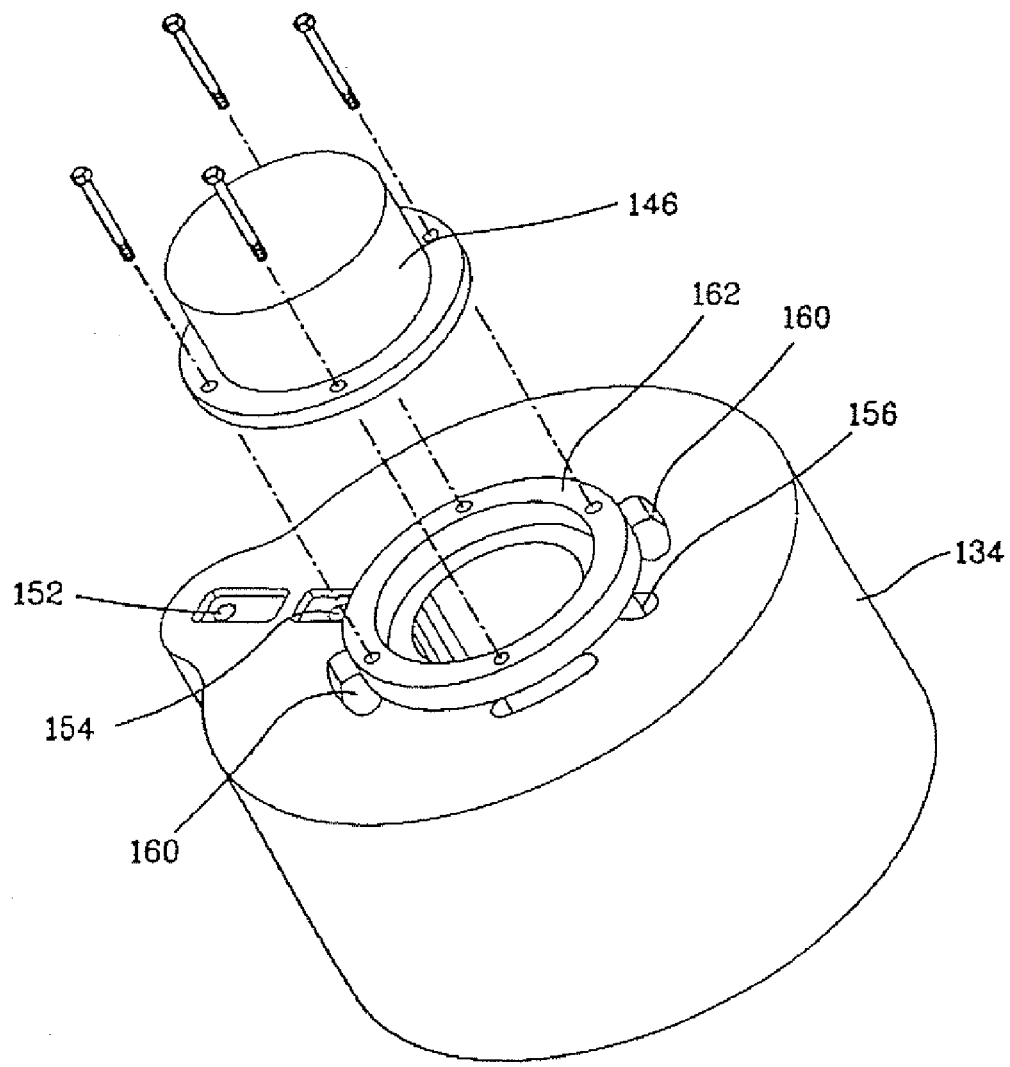
FIG. 2 is a disassembled (i.e., exploded) perspective view of a discharge cover and a front frame of a reciprocating compressor in accordance with the conventional art.
Figure 3:
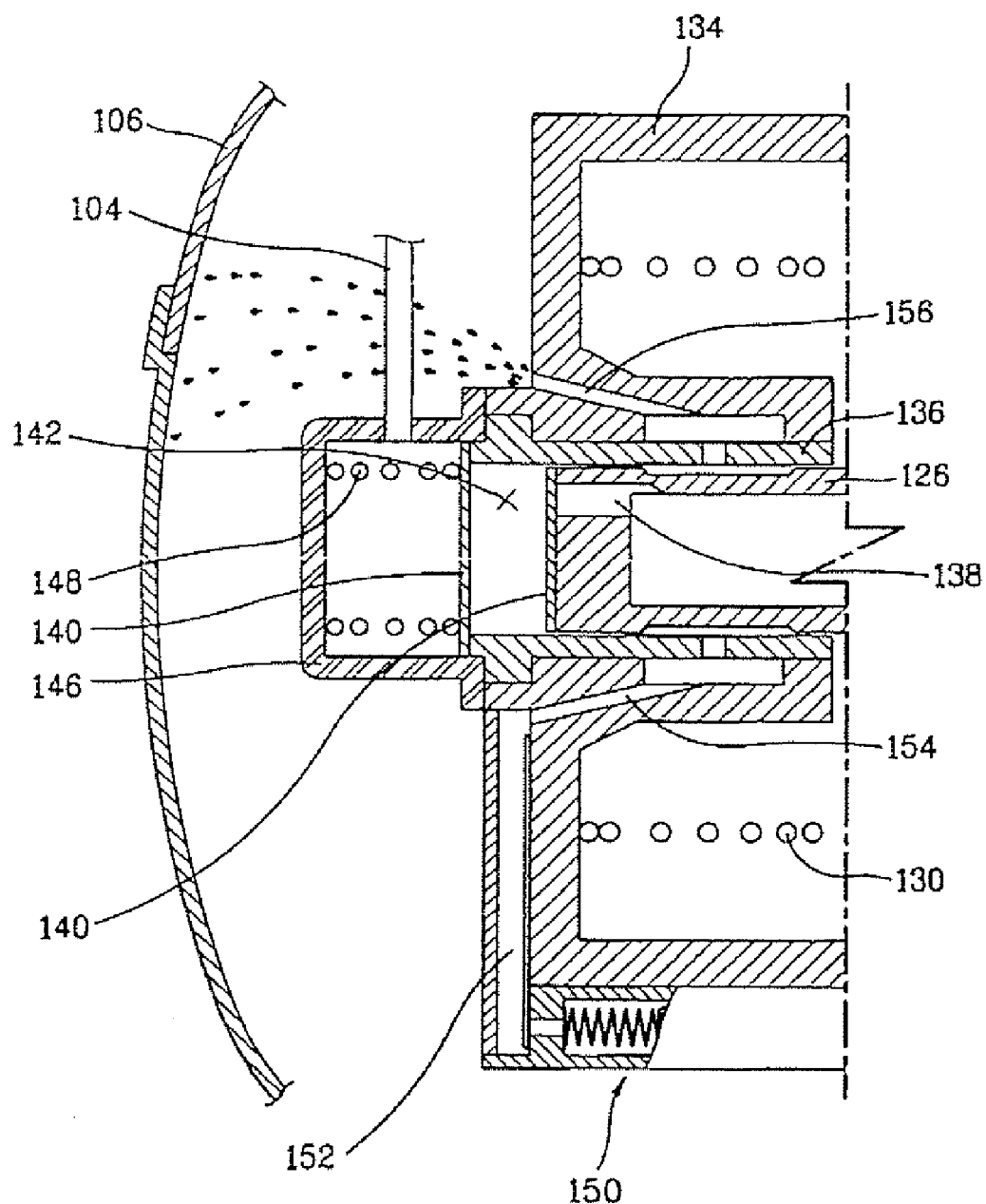
FIG. 3 is a view during operation of a lubricating device of a reciprocating compressor in accordance with the conventional art.
Figure 4:
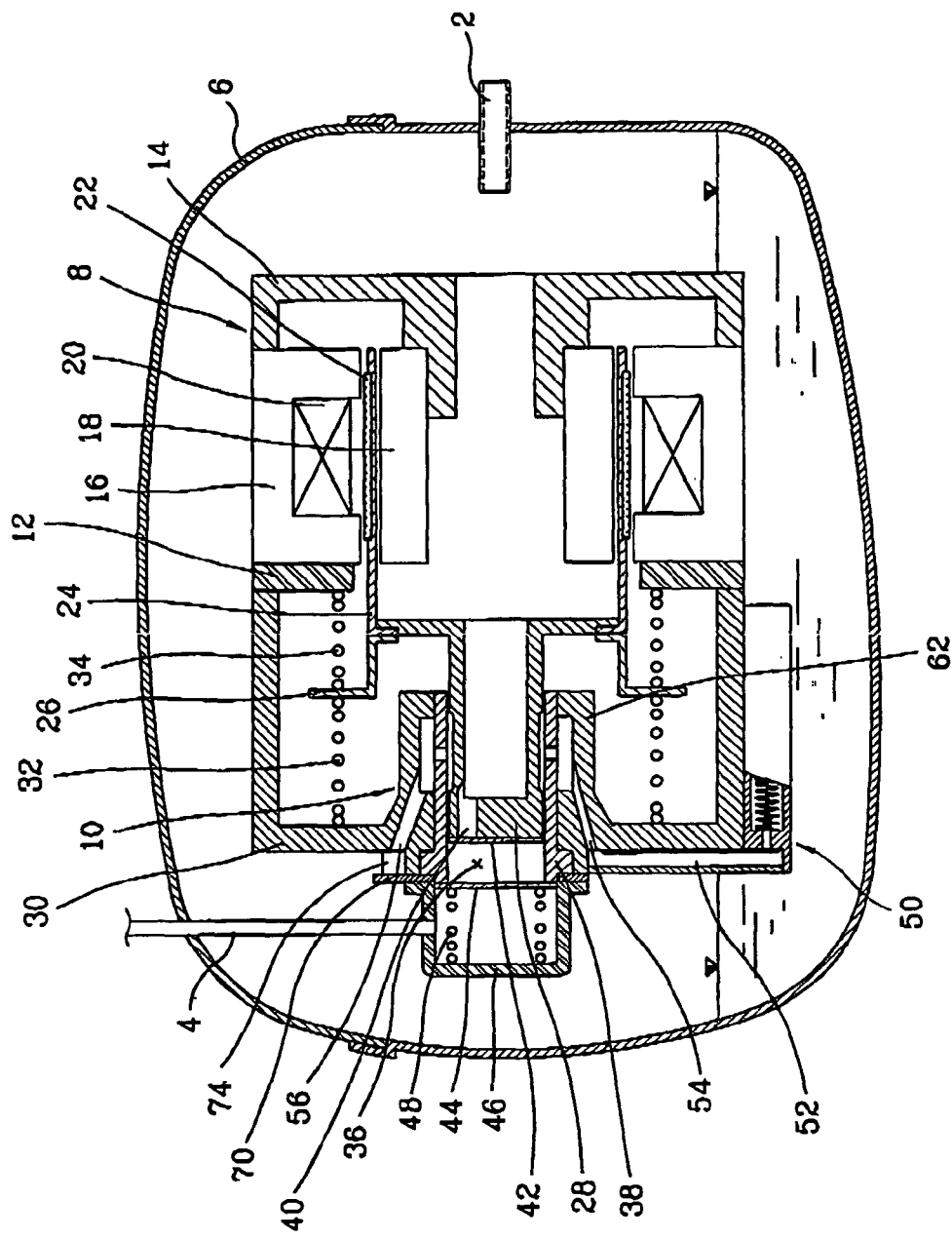
FIG. 4 is a sectional view of a reciprocating compressor according to the present invention.

FIG. 4 is a sectional view of a reciprocating compressor according to the present invention.

The reciprocating compressor according to the present invention comprises a hermetically-sealed case 6 to which a suction pipe 2 for taking-in a fluid and a discharge pipe 4 for discharging the compressed fluid are connected and a driving unit 8 is provided in the case 6 for generating a reciprocating force when power from a power source is applied. A compressing unit 10 that compresses a fluid by receiving the reciprocating force generated from the driving unit 8. A lubricating device supplies lubricating oil to each frictionally contacting part of the compressor.

The driving unit 8 includes an outer stator 16 of a cylindrical shape fixed to a middle frame 12 and to a rear frame 14, an inner stator 18 arranged with a predetermined air gap with respect to an inner circumference surface of the outer stator 16 and a coil 20 coiled about either on the outer stator 16 or on the inner stator 18 for forming a flux between the outer stator 16 and the inner stator 18 when power from a power source is applied. A magnet 22 is arranged at the air gap between the outer stator 16 and the inner stator 18 for linearly reciprocating.

The magnet 22 is fixed to an outer circumference surface of a magnet holder 24 and extends along a circumference direction with a uniform spacing from the stators. The magnet holder 24 is connected to a spring supporting bar 26 and a piston 28 of the compressing unit 10.

A first spring 32 is arranged between a front surface of the spring supporting bar 26 and a front frame 30 to provide an elastic force when the piston 28 goes backward, and a second spring 34 is arranged between a rear surface of the spring supporting bar 26 and the middle frame 12 to provide an elastic force when the piston 26 goes forward.

The compression unit 10 includes the piston 28 connected to the magnet holder 24 for linearly reciprocating and a cylinder 38 fixed at the front frame 30 and to which the piston 28 is sliding-inserted for forming a predetermined compression space 36. A suction valve 42 is mounted at a front of the piston 28 for opening/closing a fluid passage 40 formed in the piston 28 and a discharge valve assembly is mounted at a front of the cylinder 38 for opening/closing a passage for fluid to be discharged.

The discharge valve assembly includes a discharge valve 44 in contact with the front surface of the cylinder 38 for opening and closing a passage of fluid to be discharged a discharge cover 46 mounted at a front of the front frame 30 and having the discharge pipe or tube 4 connected thereto at one side; and a spring 48 arranged between an inner side of the discharge cover 46 and the discharge valve 44 for providing a predetermined elastic force to or against the discharge valve 44.

Figure 5:
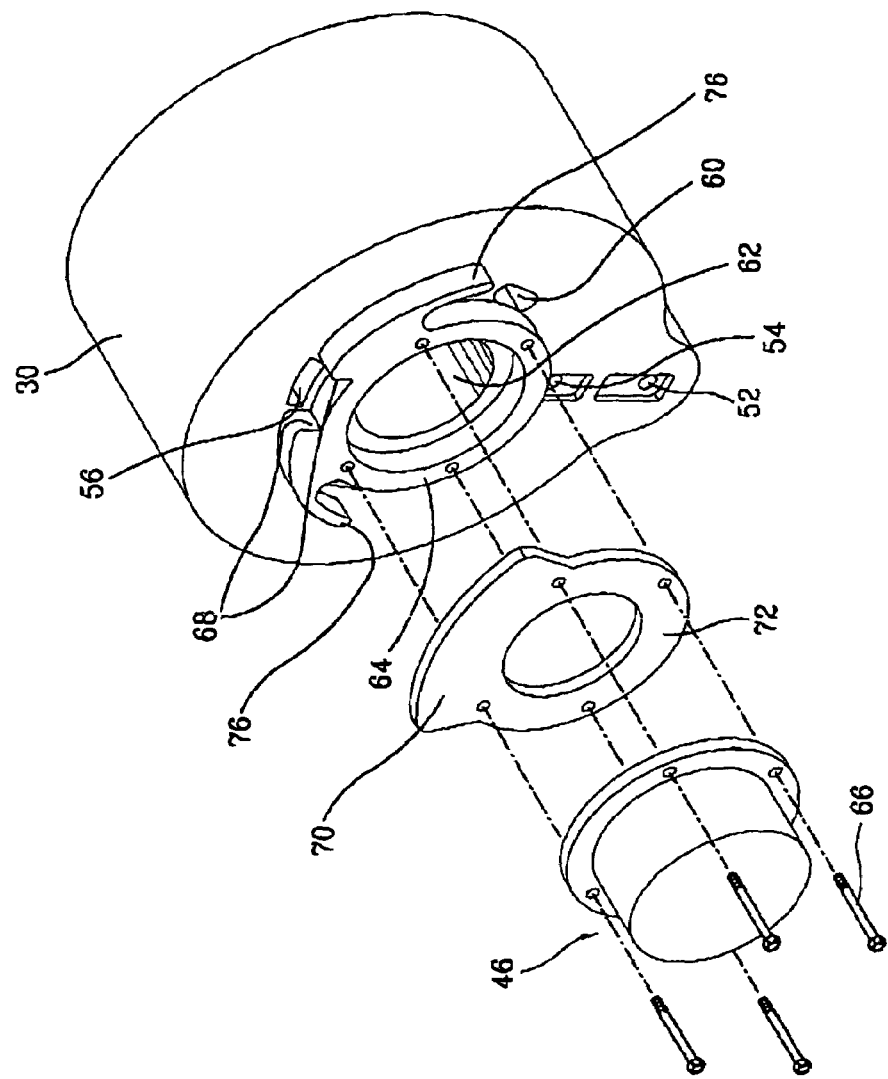
FIG. 5 is a disassembled (i.e., exploded) perspective view of a discharge cover and a front frame of a reciprocating compressor according to the present invention.
Figure 6:
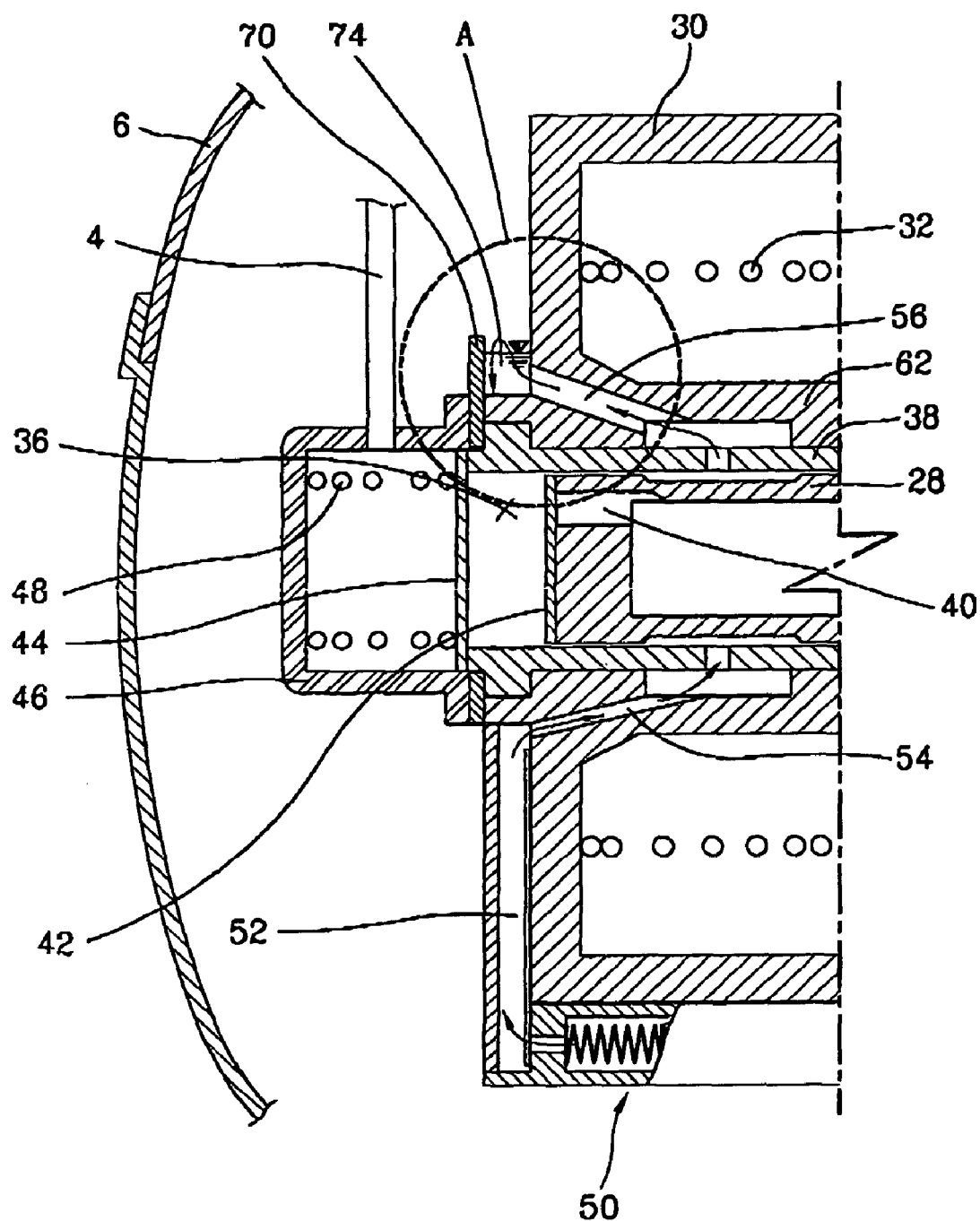
FIG. 6 is a partial sectional view showing a lubricating device of a reciprocating compressor according to the present invention.
Figure 7:
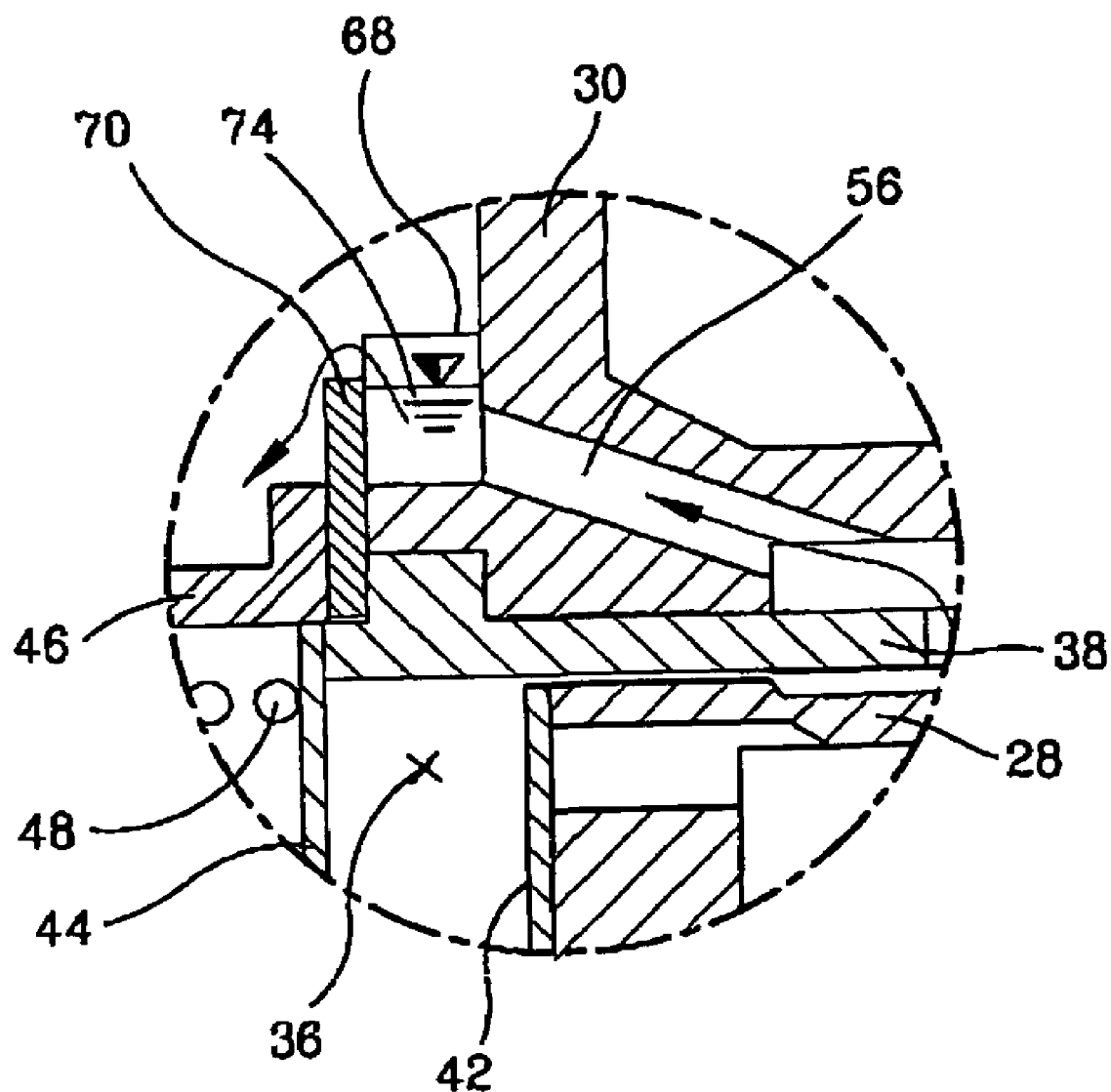
FIG. 7 is an enlarged view of part A of FIG. 6.

FIG. 5 is a disassembled or exploded perspective view of a discharge cover and a front frame of a reciprocating compressor according to the present invention, FIG. 6 is a partial sectional view showing a lubricating device of a reciprocating compressor according to the present invention, and FIG. 7 is an enlarged view of circled part A of FIG. 6.

The lubricating device comprises a pumping unit 50 arranged at a lower side of the front frame 30 for pumping lubrication oil contained at a lower side of the case 6 and a supply passage 52 for supplying the lubrication oil pumped by the pumping unit 50 to the lubrication region. A suction hole or passage 54 is connected to the supply passage 52 for sucking lubricating oil into a sliding region between the cylinder 38 and the piston 28 and a discharge hole or passage 56 is provided for discharging the lubrication oil which has finished a lubrication operation back into the case 6. A lubrication oil storage area is provided for temporarily storing the lubrication oil discharged to the discharge hole 56 and then discharging the oil to the casing. A lubrication oil guide is provided for guiding the lubrication oil in order to prevent the lubrication oil discharged through the discharge hole 56 from flowing to an air hole 60 formed at the front frame 30.

The front frame 30 includes a cylindrical cylinder fixing portion 62 formed at an inner side thereof for fixing or securing the cylinder 38, an engaging portion 64 protruding with a cylindrical shape from the front surface thereof and to which the discharge cover is engaged, e.g., by bolts 66. A plurality of air holes 60 extended along a circumferential direction of the engaging portion 64 for enabling gas to flow towards the inner and outer sides of the front frame 30 and thus preventing resistance from being generated when the piston 28 reciprocates.

Also, at the front frame 30, the suction hole 54 for supplying lubricating oil to a friction area between the cylinder 38 and the piston 28 and the discharge hole 56 for discharging the lubrication oil which finished a lubrication operation are formed.

A cross-sectional area of the discharge hole 56 of the lubricating device is formed to be larger than that of the suction hole 54, thereby lowering a pressure when the lubrication oil is discharged through the discharge hole.

The lubrication oil storage device is composed of a lateral wall portion 68 that protrudes from a front surface of the front frame 30 and has a predetermined width for covering right and left sides of the discharge hole 56, and a cover plate 72 having a frontal wall portion 70 engaged between the discharge cover 46 and the engaging portion 64 to cover a front surface of the lateral wall portion 68.

The lateral wall portion 68 integrally extends at one side of the engaging portion 64 and covers the right and left sides of the discharge hole 56 with a predetermined height.

The cover plate 72 has a disc shape—and is engaged by bolts 66 to an upper surface of the engaging portion 64, and an inner circumference surface thereof is engaged to an outer circumference surface of the cylinder 38. Also, a front wall portion 70, which covers the front surface of the lateral wall portion 68, is extended with a predetermined width at one side of the cover plate 72. The front wall portion 70 of the cover plate 72 covers the front surface of the discharge hole 56 and thus prevents the fluid discharged from the discharge hole 56 from colliding with the inner wall of the case 6.

The lubrication oil storage forms a storage space 74 where the lubrication oil discharged through the discharge hole 56 is temporarily stored in accordance with the lateral wall portion 68 covering the right and left sides of the discharge hole 56 and the front wall portion 70, part of the cover plate 72, covering the front surface. The lubrication oil temporarily stored in the storage space 74 is discharged by flowing over the front wall portion 70 or the lateral wall portion 68.

A height of the front wall portion 70 is formed to be lower than that of the lateral wall portion 68, so that the lubrication oil stored in the storage space 74 can be discharged downwardly along an outer surface of the discharge cover 46, as shown in FIG. 7.

The lubrication oil guide prevents the lubrication oil discharged through all along the discharge cover 46 from flowing into the air hole 60 and thus does not impact upon reciprocation of the piston 28. The lubrication oil guide is composed of a guide portion 76 which covers (i.e., extends over) the air hole 60 by extending, with a curved surface shape, towards right and left sides of the lateral wall portion 68 which protrudes towards the front surface of the front frame 30.

The guide portion 76 covers or extends over an upper side of the air hole 60 by being extended towards the right and left sides of the lateral wall portion 76, and thus prevents the lubrication oil discharged from the discharge hole 56 from flowing into the air hole 60 along an outer surface of the guide portion 76.

Operation of the lubricating device of the reciprocating compressor according to the present invention will now be explained.

Figure 8:
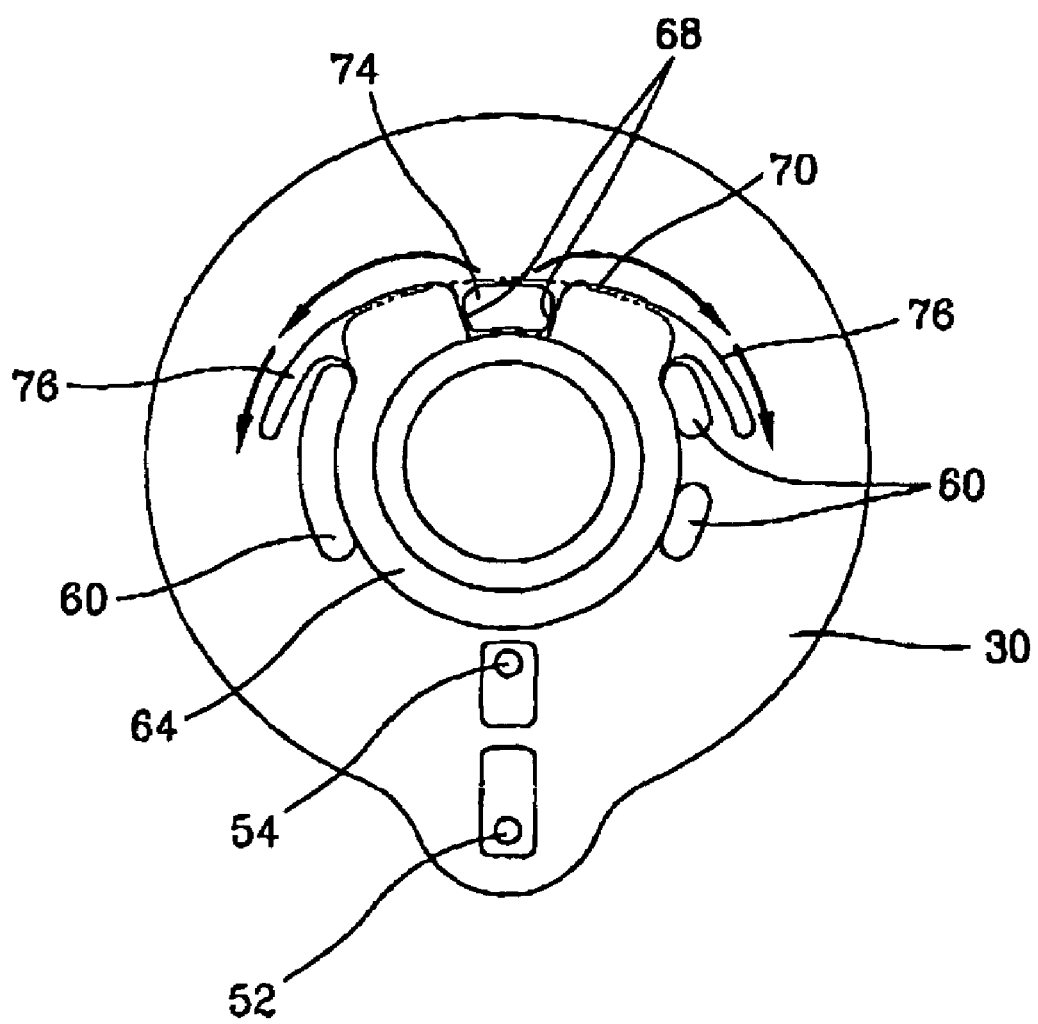
FIG. 8 is a view showing a discharge state of lubrication oil of a reciprocating compressor according to the present invention.

FIG. 8 is a frontal view of the front frame of the reciprocating compressor according to the present invention.

As the driving unit 8 is operated, the piston 28 reciprocates in the cylinder 38 and compresses a fluid sucked into the compression space through the suction pipe 2. The fluid compressed in the compression space 36 is sucked into the discharge cover 46 and then discharged through the discharge pipe 4 connected to the discharge cover 46.

At this time, the lubricating device operates to supply the lubrication oil to the sliding part or surface area between the cylinder 38 and the piston 28.

That is, if the pumping unit 50 is operated, the lubricating oil contained in the lower portion of the case 6 is pumped to the supply passage 52, and supplied to the sliding part between the cylinder 38 and the piston 28 through the suction hole 54, thereby performing a lubrication operation.

Then, the lubricating oil, which finished the lubrication operation, is discharged back to an inside of the case 6 through the discharge hole 56. The storage space 74 is formed by the lateral wall portion 68 and the front wall portion 70 arranged at the front of the discharge hole 56. Also, the lubrication oil discharged through the discharge hole 56 is temporarily stored in the storage space 74 and then flows over the front wall portion 70 or the lateral wall portion 68.

The lubrication oil discharged through the discharge hole 56 is mixed with a part of a working fluid, such as air, and generates foam. While the lubrication oil is temporarily stored in the storage space 74, foam is burst in the lubrication oil and the lubrication oil is discharged with the generated foam removed. Accordingly, noise generated due to the foam bursting when the lubrication oil is discharged can be reduced.

Also, since the lubrication oil discharged through the discharge hole 56 is temporarily stored in the storage space 74, the lubrication oil is prevented from colliding with the inner wall of the case 6, thereby reducing noise generated when the lubrication is collided with the inner wall.

Also, the lubrication oil temporarily stored in the storage space 74 is guided by the lubrication oil guide and thus is prevented from being introduced into the air hole 60 formed at the front frame 30.

That is, the lubrication oil temporarily stored in the storage space flows over the frontal wall portion 70 or the lateral wall portion 68, and is guided by the guide portion 76 that extends towards both sides of the lateral wall portion 68, so that the lubrication oil is prevented from being introduced into the air hole 60 formed at the front frame 30.

Also, the lubrication oil guided by the guide potion 76 flows down along the front surfaces of the discharge cover 46 and the front frame 30, thereby being recollected at the lower portion of the case 6. Accordingly, noise generated when the lubrication oil discharged through the discharge hole 56 falls to the lower portion of the case 6 by being sprayed can be reduced.

Figure 9:
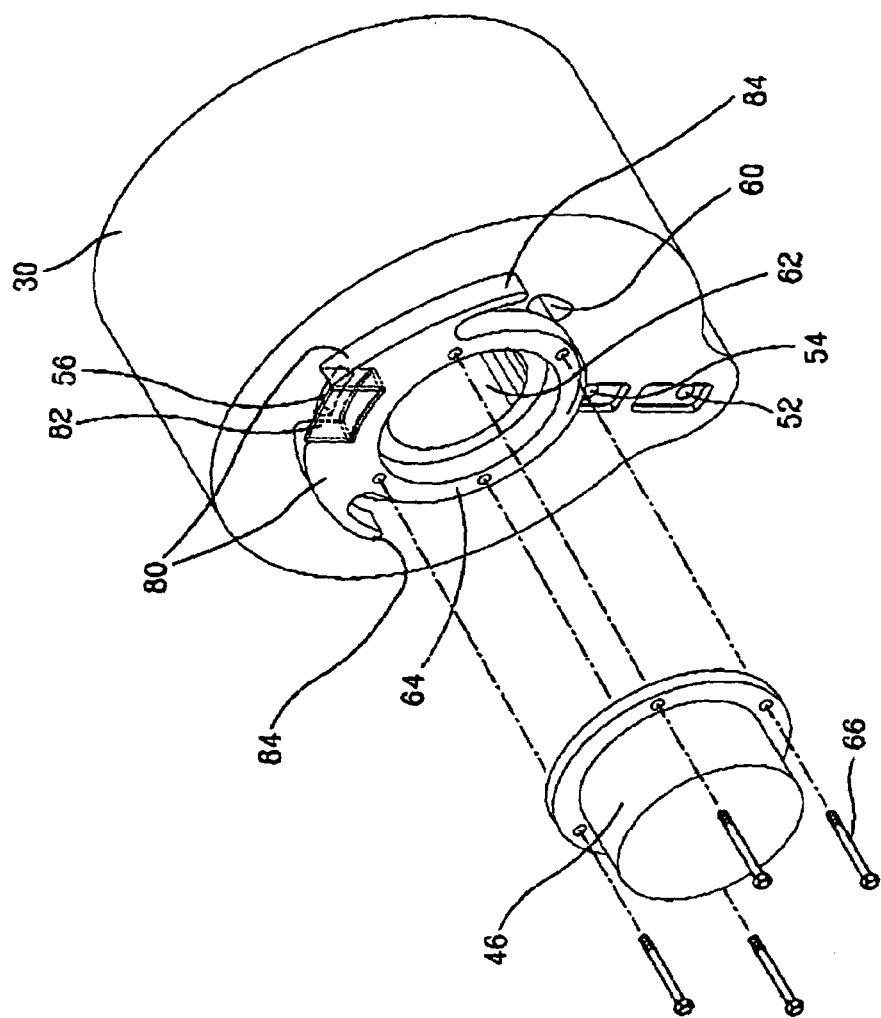
FIG. 9 is a disassembled (i.e., exploded) perspective view showing a lubricating device according to a second embodiment of the present invention.
Figure 10:
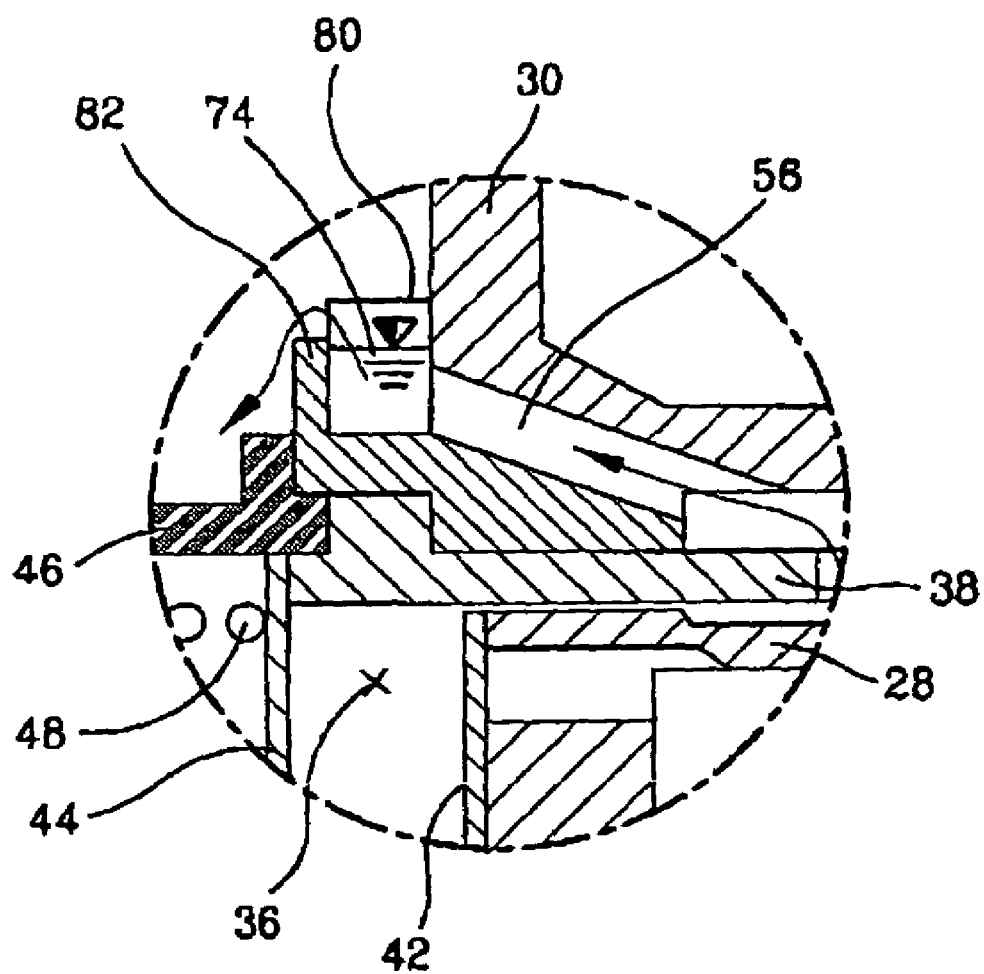
FIG. 10 is a sectional view showing a lubricating device according to a second embodiment of the present invention.

FIG. 9 is a disassembled i.e., exploded perspective view showing a lubricating device according to a second embodiment of the present invention, and FIG. 10 is a sectional view showing the lubricating device according to a second embodiment of the present invention.

The lubrication oil storage means of the lubricating device according to the second embodiment is composed of a lateral wall portion 80 that protrudes from the front surface of the front frame 30 with a predetermined width for covering the right and left sides of the discharge hole 56, and a frontal wall portion 82 integrally formed with the lateral wall portions 80 in order to cover the front surface of the lateral wall portion 80.

That is, the lateral wall portion 80 and the frontal wall portion 82 of the lubrication oil storage means according to the second embodiment are integrally formed at the front surface of the front frame 30, respectively, in order to temporarily store the fluid discharged from the discharge hole 56.

Also, the lubrication oil guide according to the second embodiment is composed of a guide portion 84 respectively extending towards both sides of the lateral wall portion 80 like in the aforementioned first embodiment.

Operation of the lubricating oil according to the second embodiment is substantially similar to those according to the first embodiment, so that its explanation will be omitted.

The lubrication oil storage of the lubricating device according to the present invention is not limited to the aforementioned structure but can be performed by various structures. Especially, the lateral wall portion and the frontal wall portion can be formed at the cover plate (cog., as part of the cover plate) engaged between the engaging portion of the front frame and the discharge cover.

In the lubricating device according to the present invention, the lubrication oil storage space for temporarily storing lubrication oil is formed by installing the lateral wall portion and the frontal wall portion respectively at the front of the discharge hole formed at the front frame, so that the lubrication oil is discharged from the discharge hole after staying temporarily in the storage space. According to this, the foam generated by the fluid contained in the lubrication oil is burst and removed while the lubrication oil stays in the storage space, thereby reducing the noise due to the foam bursting when the lubrication oil is discharged from the discharge hole.

Also, since the lubrication oil discharged from the discharge hole is temporarily stored in the storage space, noise generated when the lubrication oil collides with or impacts against the inner wall of the case can be reduced.

In addition, the lubrication oil stored in the storage space flows over the frontal wall portion and the lateral wall portion, and flows down along the discharge cover and the front frame 30. Thus, it is recollected at the lower portion of the case. Accordingly, noise generated when the lubrication oil falls to the lower portion of the case by being spraying in the compressor casing can be reduced.

Also, a guide wall portion covering the air hole is installed at the upper surface of the air hole formed at the front frame to prevent the lubrication oil from being introduced into the air hole. According to this, the reciprocating movement of the piston is not disturbed and thus a reliability of the compressor can be increased.

As the present invention may be embodied in serial forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or any equivalents of such metes and bounds are therefore intended to be embraced by the appended claims.

What is claimed is:

1. A lubricating device of a reciprocating compressor comprising:
    a pumping unit that pumps lubrication oil contained in a lower portion of a case;
    a front frame having a suction hole which supplies the lubrication oil pumped from the pumping unit to a sliding part within the case, and a discharge hole which discharges the lubrication oil after performing a lubrication operation; and
    a lubrication oil storage arranged at a front of the discharge hole that stores the lubrication oil discharged to the discharge hole for a predetermined time and then discharges the lubricating oil.

2. The lubricating device of claim 1, wherein a cross-sectional area of the discharge hole of the lubricating device is larger than a cross-sectional area of the suction hole.

3. The lubricating device of claim 1, wherein the lubrication oil storage comprises:
    a lateral wall portion that protrudes from a front surface of the front frame with a predetermined width for covering right and left sides of the discharge hole; and
    a frontal wall portion that contacts a front surface of the lateral wall portion for forming a lubrication oil storage space together with the lateral wall portion.

4. The lubricating device of claim 3, wherein the lateral wall portion of the lubrication oil storage protrudes at the front surface of the front frame and then extends at an engaging portion that is engaged with a discharge cover of the front frame.

5. The lubricating device of claim 3, wherein the front wall portion of the lubrication oil storage is an extended portion of a cover plate engaged between an engaging portion of the front frame and a discharge cover attached to the front frame.

6. The lubricating device of claim 3, wherein the front wall portion of the lubrication oil storage is lower than the lateral wall portion so that the lubrication oil in the storage space can flow over the front wall portion.

7. The lubricating device of claim 1, wherein the lubrication oil storage comprises:
   a lateral wall portion protruding at a front surface of the front frame for covering right and left sides of the discharge hole; and
   a frontal wall portion integrally formed at a front surface of the lateral wall portion for covering a front surface of the discharge hole and forming a lubrication oil storage space.

8. The lubricating device of claim 7, wherein a height of the front wall portion is lower than a height of the lateral wall portion.

9. The lubricating device of claim 7, wherein the lateral wall portion and the frontal wall portion extends towards one side of an engaging portion engaged with the discharge cover of the front frame.

10. The lubricating device of claim 1, wherein the lubrication oil storage comprises:
    a lateral wall portion protruding from a lateral surface of a cover plate mounted between an engaging portion of the front frame and a discharge cover for covering right and left sides of the discharge hole; and
    a frontal wall portion extending from one edge of the cover plate for covering a front surface of the discharge hole and forming a lubrication oil storage space.

11. A lubricating device of a reciprocating compressor comprising:
    a pumping unit that pumps lubrication oil contained in a lower portion of a case;
    a front frame having a supply hole which supplies the lubrication oil pumped from the pumping unit to a sliding part within the case and a discharge hole which discharges the lubrication oil upon completion of a lubrication operation;
    a lubrication oil storage arranged at a front surface of the discharge hole for storing the lubrication oil discharged from the discharge hole for a predetermined time and then discharging the lubrication oil; and
    a lubrication oil guide that guides the lubrication oil discharged from the discharge hole to a lower portion of the case and preventing the lubrication oil discharged through the discharge hole from flowing to an air hole formed in the front frame.

12. The lubricating device of claim 11, wherein a cross-sectional area of the discharge hole is larger than a cross-sectional area of the supply hole.

13. The lubricating device of claim 11, wherein the lubrication oil storage comprises:
    a lateral wall portion protruding from a front surface of the front frame with a predetermined width for covering right and left sides of the discharge hole; and
    a frontal wall portion contacting a front surface of the lateral wall portion for forming a lubrication oil storage space with the lateral wall portion.

14. The lubricating device of claim 13, wherein the lateral wall portion of the lubrication oil storage protrudes at the front surface of the front frame and then extends at an engaging portion that is engaged with the discharge cover.

15. The lubricating device of claim 13, wherein the front wall portion of the lubrication oil storage is extended at a cover plate engaged between the engaging portion of the front frame and the discharge cover.

16. The lubricating device of claim 13, wherein the front wall portion of the lubrication oil storage is lower than the lateral wall portion so that the lubrication oil in the storage space can flow over the front wall portion.

17. The lubricating device of claim 13, wherein the lubrication oil guide comprises a guide portion which covers the air hole by extending from the lateral wall portion protruded at a front surface of the front frame towards right and left sides with a predetermined curved surface shape.

18. The lubricating device of claim 15, wherein the lubrication oil guide comprises a guide portion which covers the air hole by extending from both sides of the cover plate with a predetermined curved surface shape.

* * * * *